US005699552A

United States Patent [19]
Whittaker

[11] Patent Number: 5,699,552
[45] Date of Patent: Dec. 16, 1997

[54] SYSTEM FOR IMPROVED PROCESSOR THROUGHPUT WITH ENHANCED CACHE UTILIZATION USING SPECIALIZED INTERLEAVING OPERATIONS

[75] Inventor: Bruce Ernest Whittaker, Mission Viejo, Calif.

[73] Assignee: Unisys Corporation, Blue Bell, Pa.

[21] Appl. No.: 592,096

[22] Filed: Jan. 26, 1996

[51] Int. Cl.$^6$ .................................................. G06F 12/08
[52] U.S. Cl. .......................... 395/473; 395/471; 395/495
[58] Field of Search ...................................... 395/468, 469, 395/470, 471, 472, 473, 482, 483, 486, 494, 496, 478, 485, 495, 493, 451, 309, 310, 311

[56] References Cited

U.S. PATENT DOCUMENTS

5,276,852  1/1994  Callandar et al. ................. 395/309
5,404,483  4/1995  Stamm et al. ...................... 359/470
5,426,754  6/1995  Grice et al. ........................ 395/454
5,553,263  9/1996  Kalish et al. ...................... 395/454

*Primary Examiner*—Eddie P. Chan
*Assistant Examiner*—Hiep T. Nguyen
*Attorney, Agent, or Firm*—Alfred W. Kozak; Mark T. Starr; Steven R. Petersen

[57] ABSTRACT

A system for interleaving invalidation cycles to a cache memory during those periods when the processor is waiting or has not need to access cache memory. These periods occur during a Read-Miss operation or when bus access delays to main memory cause the processor to wait for receipt of data, or when the processor communicates with network modules other than the cache memory and main memory.

10 Claims, 7 Drawing Sheets

SYSTEM FOR IMPROVED PROCESSOR THROUGHPUT WITH ENHANCED CACHE UTILIZATION USING SPECIALIZED INTERLEAVING OPERATIONS

BACKGROUND OF THE INVENTION

Figure 6:
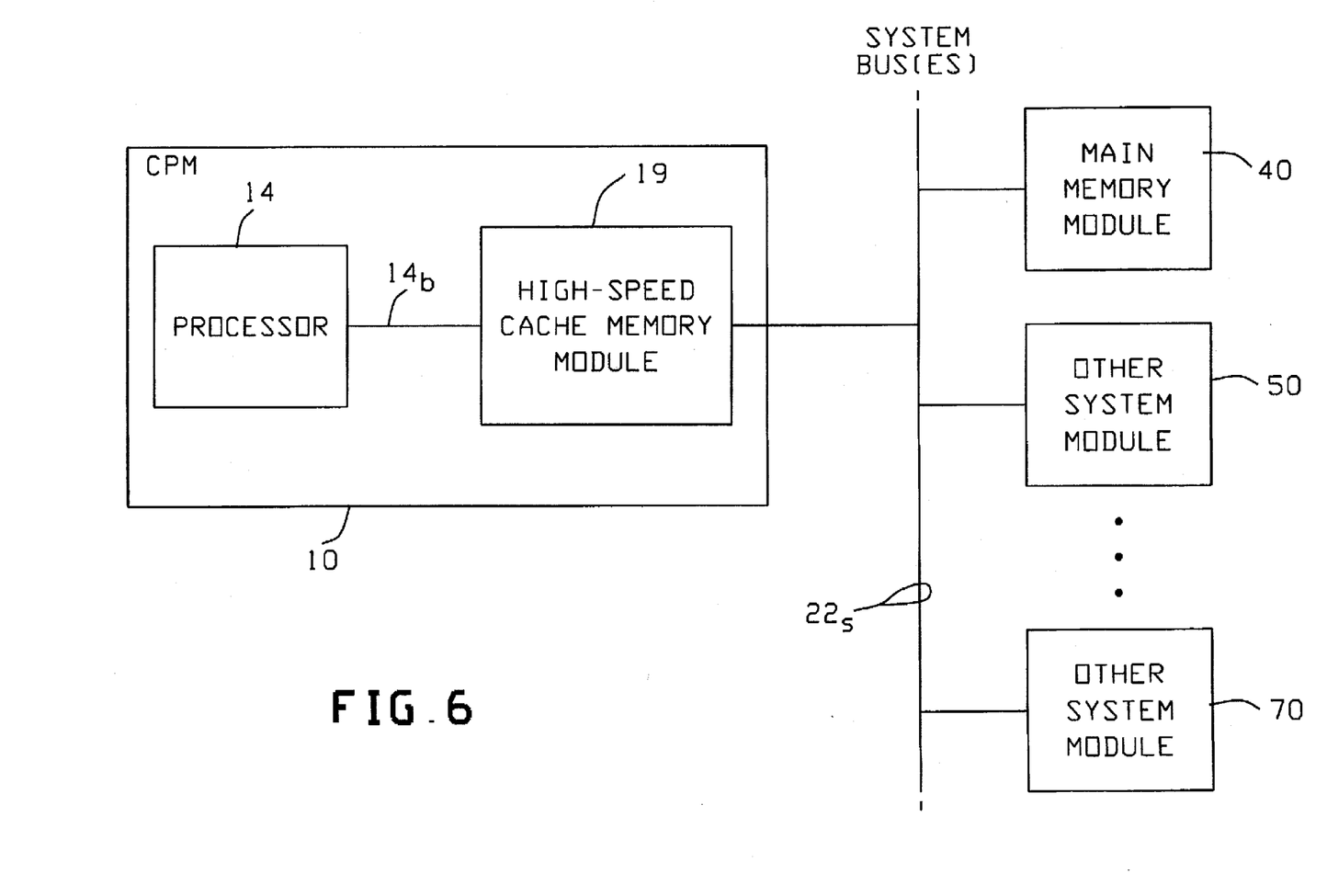
FIG. 6 is a general block drawing of a computer system connected by one or more system busses.

The general nature of a computing system is shown in FIG. 6. A Central Processing Module 10 (CPM) is the computing engine or processor unit for the system. A processor 14 resides within the Central Processing Module 10. Also seen are the system busses $22_s$ which may be either single or dual system busses and which are used to maintain communication with a main memory module 40, an input/output module 50, and other system modules such as another Central Processing Module 70.

In such a system as shown in FIG. 6, the Central Processing Module 10 generally can operate internally, very much faster and in a higher frequency band than the system bus $22_s$ can operate or even faster than the main memory module 40 can operate. Since the main memory 40 is most usually implemented with dynamic RAM devices, it will generally operate much slower than the operating rates at which the processor 14 of the Central Processing Module can function.

Because of this inherent speed discrepancy and, without help from some extra hardware, the processor 14 will have to "wait" some period of time for information from the bus $22_s$ and from the main memory 40. However, this waiting is most detrimental to system performance. As a result of this detriment, the cache memory-processor interleaving cycle system for servicing the processor was developed.

Figure 7:
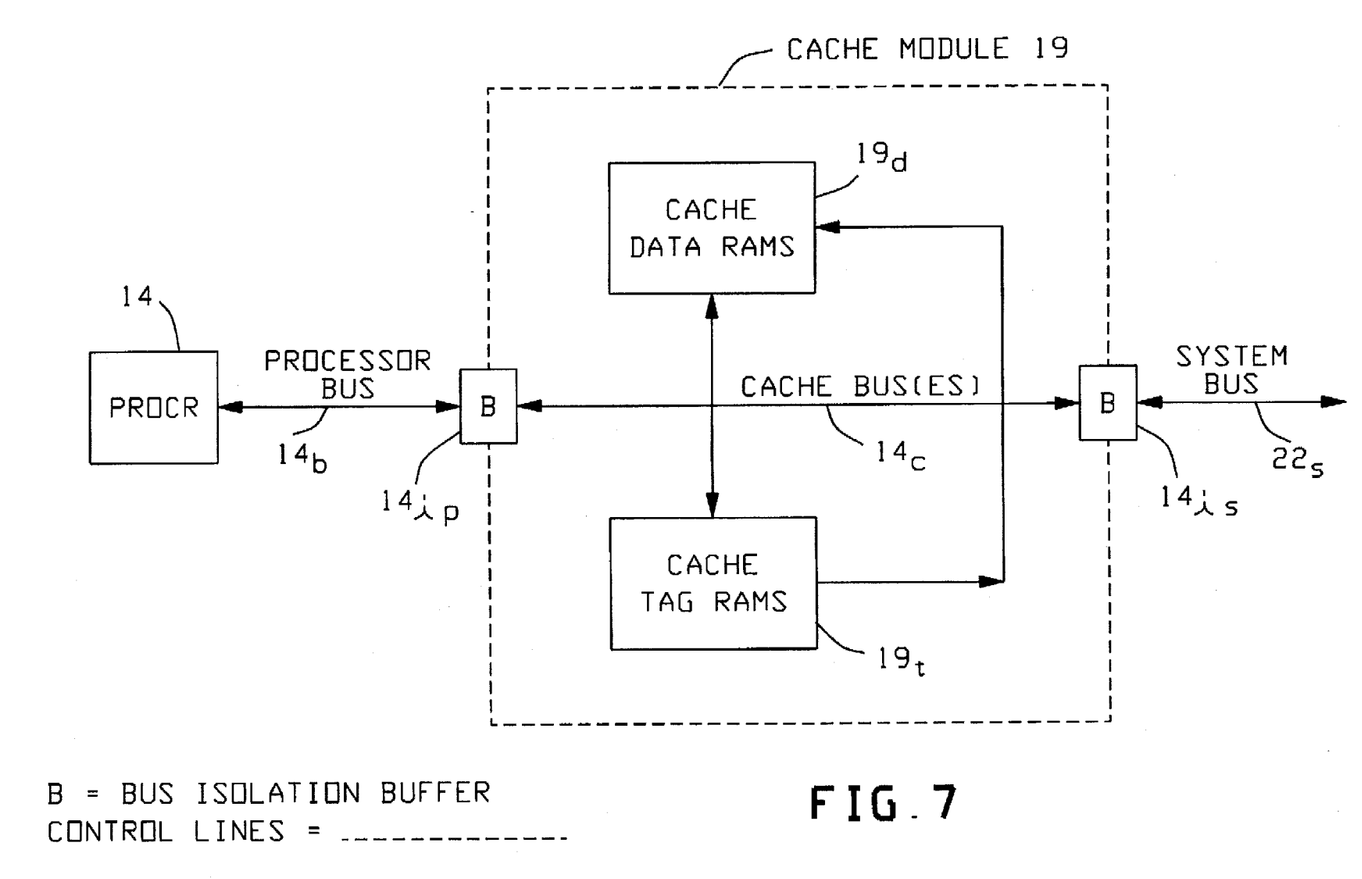
FIG. 7 is a drawing showing a computer system with an expanded view of the Central Processing Module to show the high-speed cache memory unit.

FIG. 7 is a more expanded view of the CPM 10 of FIG. 6 by showing the addition of a cache memory module 19 directly connected to the processor 14. Generally, cache memory designs will be implemented with very high speed but costly static RAM devices. These RAM devices provide fast data availability for some portion of the processor's memory data requirements.

Figure 1:
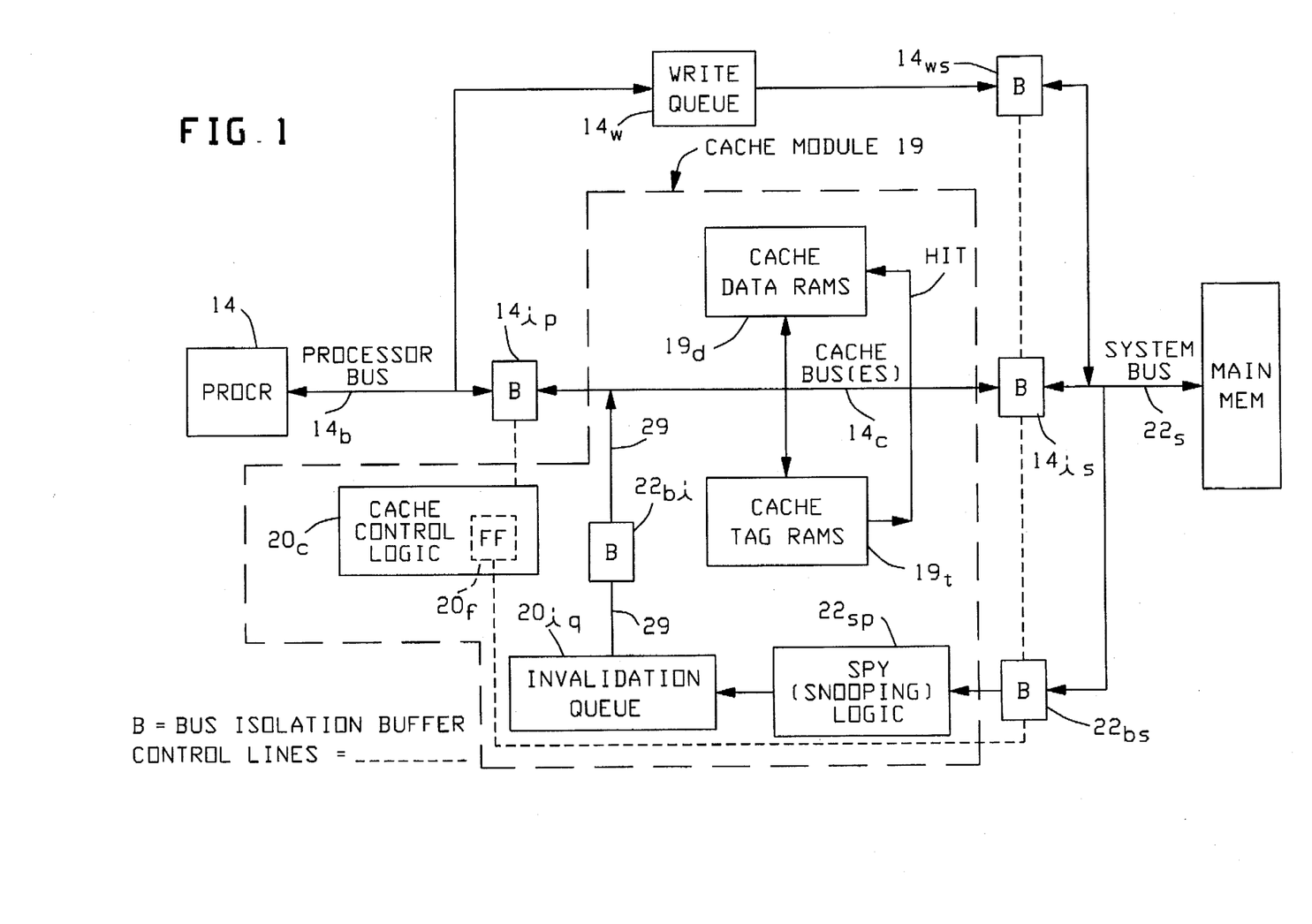
FIG. 1 is a diagram of a cache memory module showing the data units and address TAG units connected with a cache bus in between a processor bus and a system bus.

FIG. 1 indicates a diagram of a cache memory module, such as module 19. Shown therein is the incoming processor connection on the processor bus $22_b$, and the outgoing system bus connection $22_s$. Internal to the cache is a cache bus designated $14_c$. Connected onto this cache bus there is seen a Tag RAM unit assembly 19t and a data RAM unit assembly 19d. The Tag RAM monitors addresses received from the processor 14 in order to provide required data requests to the processor 12. The Tag RAM 19t will detect whether the cache 19 contains a "valid copy" of the addressed word which is desired by the processor. The Tag RAM produces a "hit" indication on line 27 if the cache memory module does indeed hold the addressed word.

The Data RAMs 19d will contain a large number of memory data values or words that can be indexed by their address values. If the Tag RAM indicates a "hit" condition on line 27, then the Data RAM 19d can supply the data information almost immediately to the processor 14 without needing to access any of the system bus resources, such as that of the main memory 40 (FIG. 6). It may be noted in FIG. 1 that the buffer blocks $14_{ip}$ and $14_{is}$ are used for bus isolation and are bi-directional in nature.

The FIG. 1 shown is, of course, a simplified drawing for ease of description. However, an actual cache may have several different bus structures, perhaps separate address busses and data busses, and further perhaps even several partial address busses. There are also several different cache architectures which are commonly used.

The present disclosure pertains to the type of cache memory designated as "Write-Through" cache. In this type of cache, all Write-type operations go to the main memory 40. Additionally in this situation, the cache Data RAMs 19d will be "updated" with the new Write information (that went to main memory 40) if the Tag RAM 19t indicates that a "hit" exists at this particular address value.

As seen in FIGS. 6 and 7, there are other modules that can also access the main memory 40, for example, the I/O processor module 50 and possibly other additional Central Processing Modules such as 70 of FIG. 6. In this case, the cache memory 19 must be provided with some additional hardware logic in order to assure that the cache data and the main memory data address values stay in synchronism or are "coherent". Thus, FIG. 1 indicates the spy logic 22sp inserted into the cache module 19 in order to provide for the spying or snooping of Write operations on the system bus $22_s$, and also to accumulate addresses in the invalidation queue 20iq which will be used on invalidation cycles to the cache Tag RAM 19t in order to nullify any addresses and data which have been now changed in the main memory 40.

Thus, as seen in FIG. 1, the spy logic 22sp connects via bus isolation buffer 22bs to the system bus $22_s$. The output of the spy logic is fed to the invalidation queue 20iq which stores a list of invalid addresses which can be used on invalidation cycles over bus 29 and through the isolation buffer 20bi over to the cache bus $14_c$ in order to invalidate any specific address in the cache Tag RAMs 19t.

The spy logic 22s monitors system activity on the system bus $22_s$ for address values for any Write type of operation that will modify the data values in the main memory 40. When this happens, such addresses are then placed within the invalidation queue mechanism 20iq of the cache.

Then at some subsequent convenient time, these queued addresses in the invalidation queue are sent onto the cache busses $14_c$ for investigation and comparison by the cache Tag RAM unit 19t. If the Tag RAM 19t indicates a "hit" condition at this particular address value, then there is a "invalidation cycle" which must take place so that a particular address in the Tag RAM is marked as "invalid" at the corresponding address value. Thus, a "hit" will not occur when this address is subsequently presented to the cache 19, until a new value for this address may sometime later be put back into the cache module to insure coherency with the changed word information at that address in the main memory 40.

In the situation seen in FIG. 1, the valuable resources of the cache must be shared between the processor 12 and the invalidation queue 20iq. Thus, the allocation for use of the cache module presents certain types of problems as to "contention" between the processor's access to the cache memory and the invalidation queue's access to the cache memory. The balance between these allocations must be controlled in order to provide the most efficient operation for overall the system. The present system provides methods by which operations utilizing the cache module 19 are interleaved or time-sliced in certain specialized situations in order to enhance the overall processor systems operational efficiency. By using the interleaving of invalidation cycles with the necessary processor operations to access cache memory, and by adding in some special functional features, much of the necessary overhead of the spying/invalidation usage of the cache memory is accomplished behind the back of the processor, and thus does not inhibit or slow down the processor's access to the cache memory.

SUMMARY OF THE INVENTION

The presently disclosed system minimizes the unavailability of a cache memory module to the processor by using a system of inter-leaving the invalidation cycles with processor operations, thus making the invalidation cycle virtually invisible to the processor. A specialized set of circuitry locates those time periods where the processor does not need accessibility to the cache such that these time periods can then be utilized for invalidation cycles.

The system is organized to detect when a "Read-Miss" condition occurs indicating that there will be "waiting" time available for completing invalidation cycles while the processor is waiting to receive data from the main system memory. A special "early marking" feature is utilized in the cache memory to indicate those periods when the processor is waiting for data from main memory for its own use and replacement into the cache memory.

Problems which would normally arise for the "early marking" arrangement could lead to consequences which include (i) during invalid address conditions, the processor has to access a non-existing location in memory, so that the so-called cache "early marking" is inaccurate under those situations where it is marked as valid for an address for which there is no data, and (ii) during a bus retry limit condition, some system bus contention has occurred that is causing either a "retry" operation or a "time-out" operation or a "bus parity error" condition. As a result of this, no data will be returned from main memory back to the processor and cache, so in this situation, the cache "early marking" arrangement has been falsely marked as valid when it should not be.

The present system handles these "abnormal" termination conditions which are detected on a "Read-Miss" operation, so that a special flag flip-flop is set to remember that this condition has occurred, so that the cache TAG unit, which earlier has been set as "valid" is then marked as "invalid" at the second clock time.

An additional feature of the system involves a "Write Queue" providing circuitry to hold a series of processor "Write OPs" to main memory, so that the processor can be unburdened from holding these incomplete cycles while independently allowing the Write Queue to go ahead and perform Write Operations to main memory.

DESCRIPTION OF PREFERRED EMBODIMENT

In general processor-cache operations, past experience indicates that the processor may need access to the cache memory about every five to seven clock times, on an average basis. The purpose for adding the cache memory hardware was to allow an immediate data return to the processor for most of its memory "Read" type operations.

However, to maintain current valid and coherent data available in the cache for the processor to read out, some cache overhead operation is required. This overhead operation is called "spying" or "snooping". Thus, the spy or snooping logic $22sp$ of FIG. 1 is shown connected to the system bus $22_s$. Such spying necessitates another contender for access to the cache module 19, namely, this involves the invalidation queue $20iq$ of FIG. 1. Here, addresses from Write-type operations from other system modules such as 40, 50 and 70 of FIG. 6, will be checked against the local cache memory 19 for "hit" conditions. If such a "hit" occurs on a spying address value, then this particular value within the cache module 19 must be marked as no longer valid or as "invalid". Thus, for example, the cache Tag RAM $19t$ of FIG. 1, would have an invalid bit (V=0) placed against a particular address. Such actions are called "invalidation" cycles.

The necessary sharing of cache module 19 and its internal resources for the purpose of assuring current, valid cache data, may cause the cache module at times to not be available to the processor for the processor's own personal operations. Thus, the processor 14 of FIG. 1, may not always have the cache memory 19 available for its use. Such unavailability of the cache memory to the processor 14, will affect the performance in a negative fashion. The present system presents a method for minimizing the unavailability of the cache memory to the processor by the interleaving of the invalidation cycles with the processor operations in a fashion which does not inhibit the processor access to the cache memory.

Invalidation cycles are initiated when the invalidation queue $20iq$ contains address values needing to be checked against addresses residing in the cache Tag RAMs $19t$ of FIG. 1. When the invalidation queue does contain such an address value, then the invalidation cycle logic will "contend" to get access to the cache module 19. Since normally the processor 14 maintains control of the cache resources to allow the processor the greatest possible access and performance, it may be noted, however, that in this type of operation, if the processor does "not need" the cache memory at any given point in time, while at the same time the invalidation queue $20iq$ "does need" the cache 19, then the invalidation queue will be given control of access to the cache memory 19 in order to accomplish at least one invalidation cycle, during the time that processor 14 does not need cache access.

The Cache Control Logic $20c$ of FIG. 1 controls the direction of signal flow for the buffers $14ip$, $22bs$, $14is$ and $14ws$ by enabling or disabling access to the cache bus $14c$ seen connected by the dashed line of FIG. 1. The Cache Control Logic $20c$ also monitors the state of the processor OPs and whether the processor 14 or invalidation queue $20iq$ will get access to cache memory 19.

Once the invalidation cycle is granted for access to the cache memory 19, it can perform several activities. First, the cache busses $14_c$ of FIG. 1 are turned around by the buffers (B) under control of the Cache Control Logic $20c$ from the normal position of receiving address information from the processor 14 via bus $14c$ to that of looking at the invalidation queue address values via bus 29. This turning of the bus adds one clock time to the invalidation cycle, but it allows better processor performance under normal operating conditions.

Secondly, the invalidation cycle operation checks the cache Tag RAM 19t for a possible "hit" on the invalidation address. Then thirdly, if a "hit" did occur, the Tag RAM 19t is marked as no longer valid (V=0) for that particular address, that is to say, the invalidation cycle has been completed. This third step will only occur on "hit" conditions which are a smaller percentage of the time, perhaps only 10 percent of the address values residing in the invalidation queue 20iq which derived from the spying process by the spy logic 30. Thus, most invalidation cycles only need to access the cache module 19 for two clock times. For some small percentage of invalidation cycles, an additional third clock time is required.

Additionally, seen in FIG. 1 is a Write Queue 14w which carries OPs for execution by unburdening the processor 14 as described hereinafter under "processor write operations".

Figure 2:
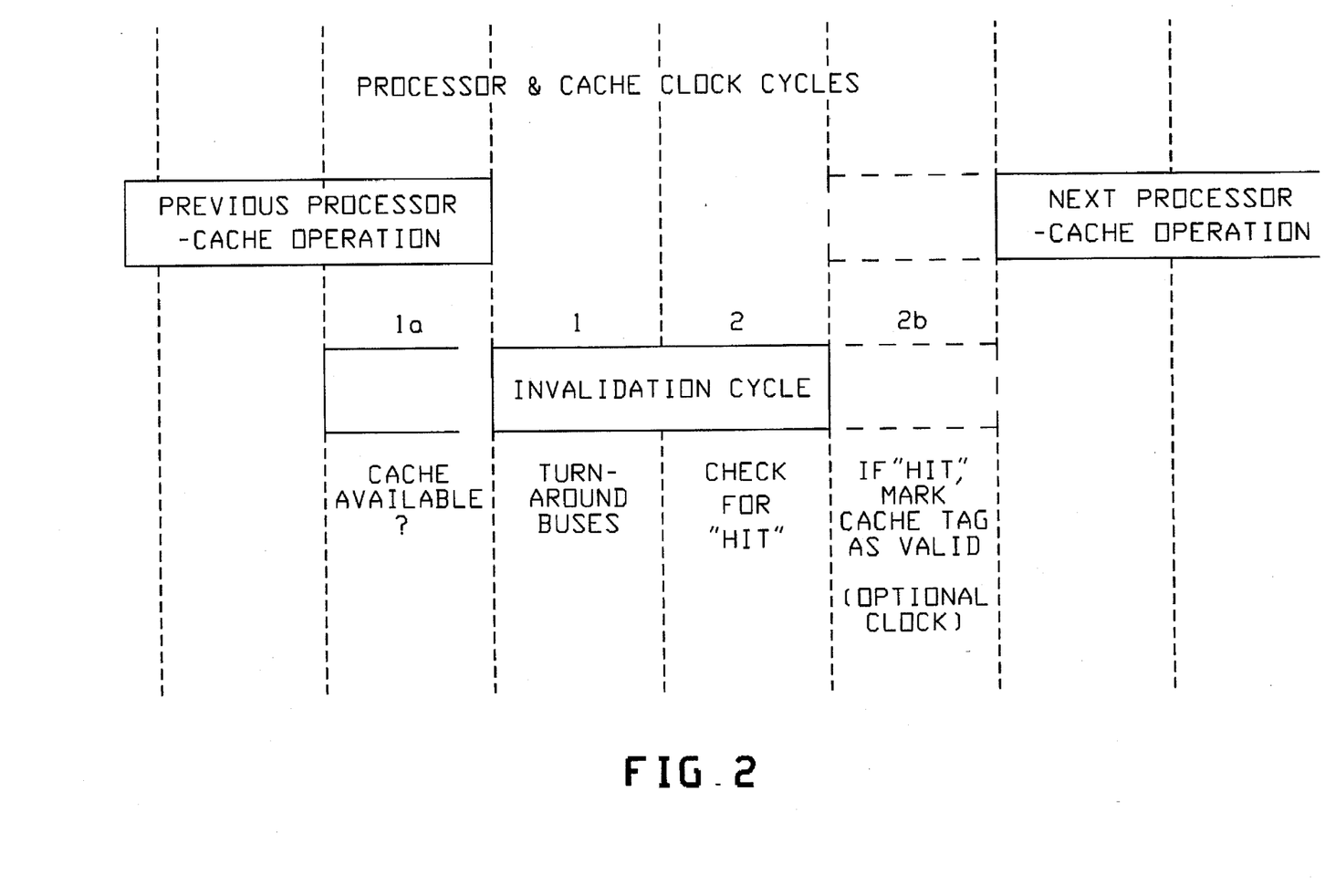
FIG. 2 is a timing drawing showing how invalidation cycles are interleaved between periods when the processor is not required to access the cache memory.

FIG. 2 shows the basic timing flow of an invalidation cycle. It may be noted that the actual invalidation step (involving marking sequence [2b in FIG. 2?] of the Tag RAM address as invalid) is indicated as an occasional occurrence and does not happen on all invalidation cycles. In FIG. 2, at clock time 1a, Cache Control Logic 20c checks to see if cache 19 is available. Then the invalidation cycle (clocks 1 and 2) will first turn around the busses 14c (FIG. 1) and check for a "hit" in the Tag RAM 19t. If a hit occurs, then at clock 2b, the cache Tag address is marked "invalid" (V=0). It will be seen that the invalidation cycle is operating "between" the "previous" processor-cache access cycle and the "next" processor-cache access cycle.

The presently described system allows the mentioned invalidation cycles to be inter-mixed or interleaved among the normal processor-type operations. Fortunately, most invalidation cycles only require two clock time accesses to the cache memory 40. Only a small number of invalidation cycles need an additional third clock period. Within normal processor operations, numerous occasions occur where the processor is out of the picture for cache access for at least two clock times. These particular occasions provide possible "opportunity windows" for the interleaving of invalidation cycles.

There are four different types of processor operations which can provide windows of opportunity for the interleaving of invalidation cycles with processor access operations. The goal involved here is to try to make the invalidation cycles virtually "invisible" to the processor, so that the processor tends to always get access to the cache memory resources whenever the processor needs it.

There are four types of situations to be designated as A, B, C and D, hereinafter, which provide processor operation types which provide differing amounts of interleaving opportunity for invalidation cycles to occur. These are described hereinunder.

A. Processor Read Memory Operation

By far, memory READ operations are the most frequent of processor operations that utilize the cache 19. Also, Reads provide the most important window of opportunity for the interleaving of cache invalidation cycles. With the type of cache memory present in the described system, there are two general types of Read operations that can occur. These are: (i) Read Hit and (ii) Read Miss. A "Read-Hit" occurs when the processor 14 attempts to read a given memory address and that address is "valid" in the cache module 19. Thus, a cache-hit occurs and the read data is "immediately" returned to the processor 14 for continued processing. This is, of course, the most optimal case. This is why cache module hardware was implemented in the system, thus to provide a quick data return on a large percentage of processor Read operations. An efficient cache system should provide HITs at greater than 90% on the average of processor Read operations. The Read HITs cycles however, do not provide any interleaving opportunity.

Figure 3:
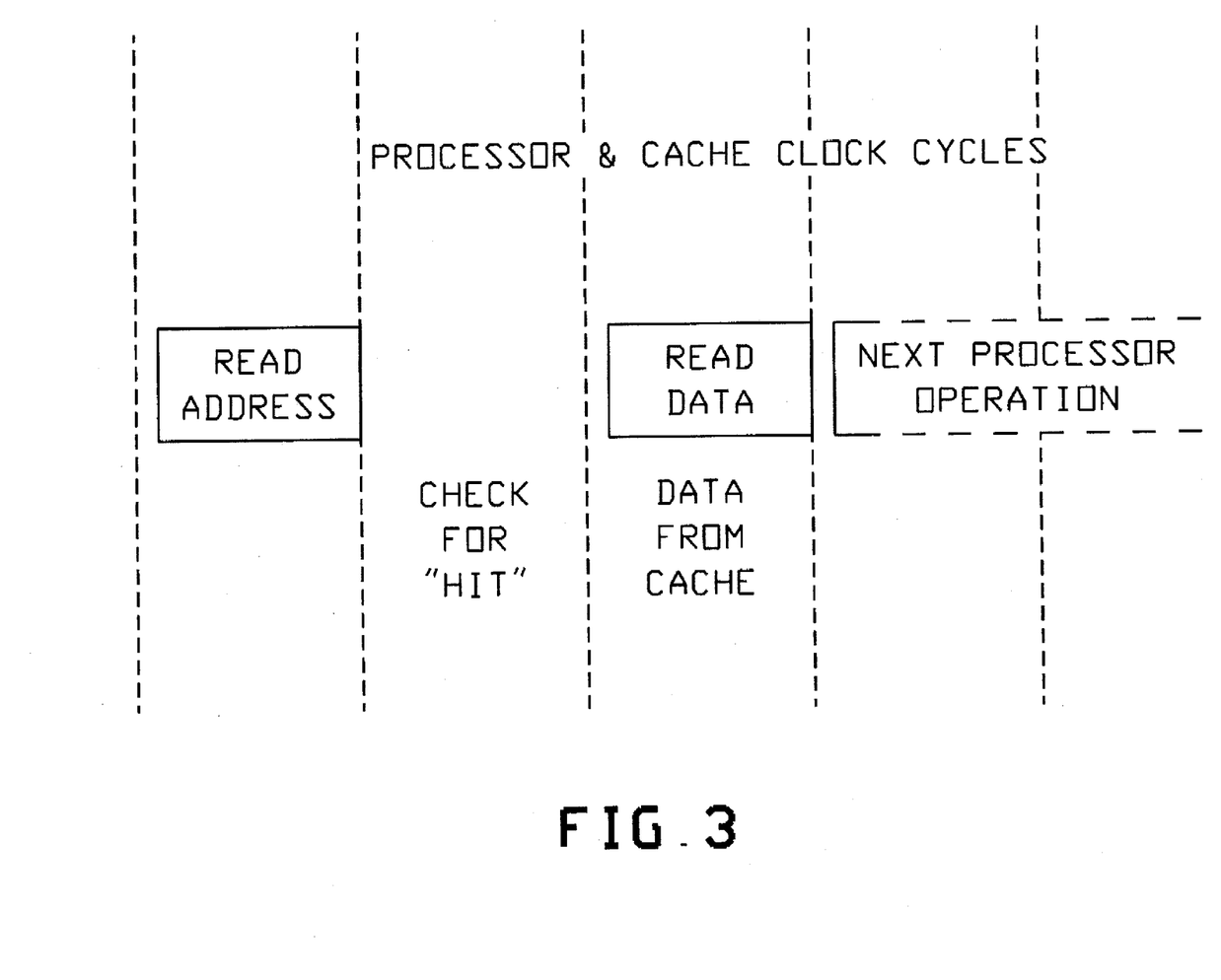
FIG. 3 is a schematic timing diagram showing the sequence of processor and cache clock cycles.

FIG. 3 is a diagram illustrating the basic Read-Hit timing. Here, the first clock cycle involves the delivery of the Read address to the Tag RAM 19t. A check is made on the next clock cycle for "hit". The "hit" occurs and on the third clock cycle, data is read from cache to the processor after which on the next cycle, the processor can continue with its next operation.

Figure 4:
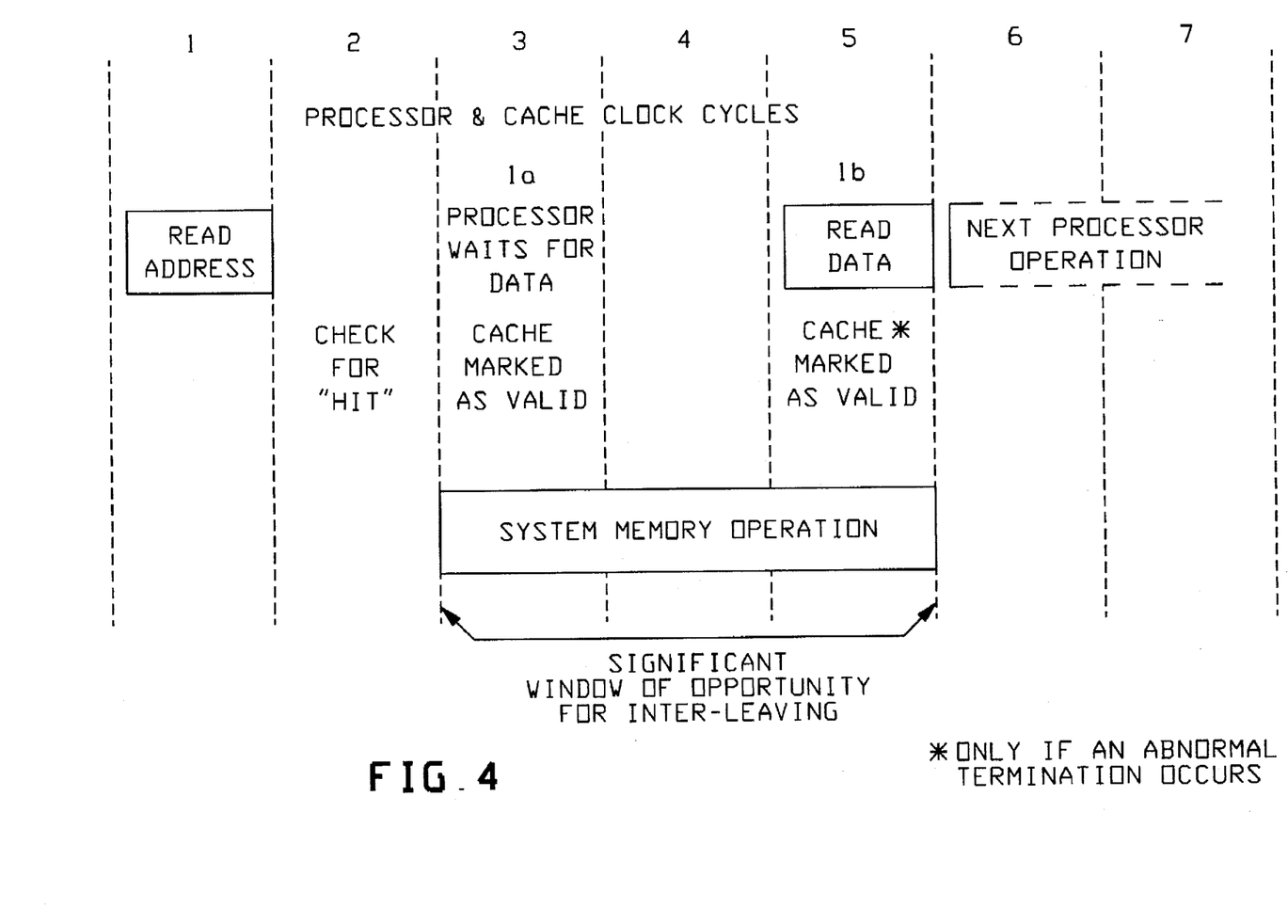
FIG. 4 is a schematic timing diagram showing a Read-Miss operation which provides a window of opportunity for interleaving invalidation cycles.

A "Read-Miss" condition occurs for the remaining approximately 10% of processor Read operations. This means that, when the cache does not contain valid data for the given memory address, then a Read-Miss occurs. The "Miss" conditions provide a significant opportunity for interleaving. FIG. 4 shows the sequence of clock periods involving the Read-Miss situation. Thus, a sequence of clock cycles occurs first for reading (1) the address from the processor, after which the cache 19 is checked for a hit address (2). During the third clock cycle, the processor waits for data, but since there was no "hit" but only a "miss", the processor must seek the information from the main memory 40 which, as indicated in FIG. 4, may involve 3 or more clock cycles before the data is presented to the processor, after which the processor is available for its next processing operation. It will be seen in FIG. 4, that during the system memory operation, and during the clock cycles 3, 4 and 5 (or more clock periods), there is a significant window of opportunity for the interleaving of other cycles, such as the invalidation cycle without inhibiting any of the processor's operations.

For the Read-Miss situation, the requested Read data must be taken from the main system memory 40, since it is not valid in the cache memory 19. Generally, actions over the system busses 22s to the main memory 40 take many more clock times due to bus traffic conflicts, bus busy conditions, bus protocols, and the inherent slower transfer rates on multiple module general purpose bus structures. Typically, an on-card cache memory can operate at clock frequencies much higher than an off-card backplane or motherboard type of bus structure.

The delay time (1a, Clock 3) in FIG. 4, while the processor is "waiting" for the receipt of Read data from main memory 40, after the Read-Miss situation, provides a time period for significant interleaving of invalidation cycles. It may be noted from FIG. 4, that the Cache Tag 19t is automatically marked as "valid" for the address location on this particular Read-Miss operation. This is done by the Cache Control Logic 20c. This automatic action frees up the total cache resource during the subsequent delay period of waiting for the return of Read data.

As soon as the Read-Miss condition is detected as seen in FIG. 4, any queued-up invalidation cycles can immediately access the cache module 19 and begin operation. Referring back to FIG. 2, it will be seen that most invalidation cycles take two processor clock periods to complete and about 10% of the invalidation cycles, of those with a "hit" detection, will take three processor clock cycles to complete. Thus, during the delay period (clocks 3, 4, 5, or more, of FIG. 4) of waiting for Read data from main memory, many invalidation cycles may be completed and flushed from the spy queue 20iq.

A typical Read-Miss delay period may be 15–20 "processor clock times" since it may be noted that the system bus operates at a much slower rate than the processor 14. During such a period of time, perhaps as many as 8 invalidation cycles can be flushed from the invalidation queue 20iq. All of this working operation is virtually "behind the back" of the processor 14 which is still idling and waiting for the Read data from main memory.

In FIG. 2, it was seen that, at the first clock of an invalidation cycle (at clock period 1a), tests occur for the availability of the cache module 19 for an invalidation cycle, but that the processor 14 is still given preference. Therefore, each invalidation that occurs during the Read-Data-Delay period, first tests whether the cache resource is needed by the processor 14. If the Read data word is being received from main memory 40, the invalidation operation will release the cache 19 back to the processor 14 for its use and will wait for a later opportunity to complete the invalidation cycle.

B. Processor Read-Lock Operation

Another processor operation, that provides a window of opportunity for the interleaving of the cache module, is the "Read-Lock" operation. This operation is very similar to the Read-Miss case in paragraph A. The Read-Lock operation does a "swap" between the processor 14 and main memory 40 at a given address. Thus, a word from the processor 14 is sent to and written into the main memory location, and the previous contents of that main memory location is then returned to the processor 14. This operation always goes to main memory and does not go to the cache module. It, however, always looks similar to a Read-Miss case situation and it always provides a significant delay period while waiting for the system bus and main memory activity to complete.

Like the Read-Miss case discussed in paragraph A, many invalidation cycles can be flushed from the invalidation queue 20iq during the delay period. It may be noted, however, that Read-Lock operations are much less frequent in occurrence compared to Read operations. They are not, therefore, as powerful an interleaving opportunity, but they do, nonetheless, allow for some interleaving of cache operations.

C. Processor Write Operation

The second most frequent processor operation that provides a window of opportunity for interleaving of the cache module, is the "Write" operation. The Write operation takes a word from the processor and writes it into the addressed main memory location. For this cache design, if a "hit" condition is detected in the cache for the given address, then the cache data is also updated with the word value from the processor.

Figure 5A:
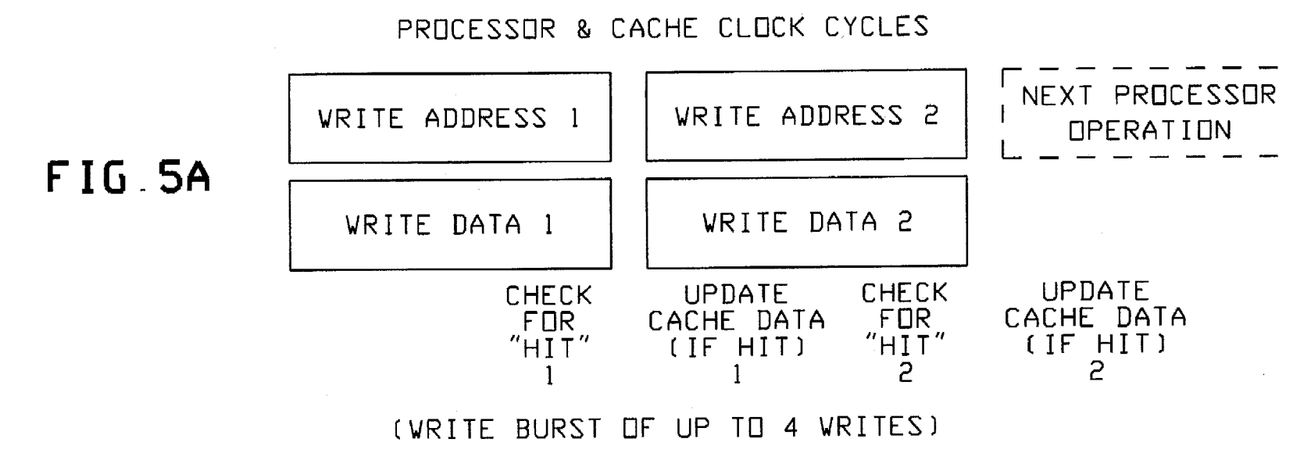
FIG. 5A is a schematic timing drawing showing the Write-Burst operation.

Write operations can be considered here as coming in "bursts" from the processor, since the processor often needs to write "blocks" of data into some memory buffer. FIG. 5A illustrates the timing for a Write operation. FIG. 5A shows two Writes of a burst action. Considering that the processor 14 operates much faster than does the system bus 22s in main memory 40, it is useful to buffer-up several processor Write operations in a queue mechanism external to the processor 14. This "write-Queue" 14w, FIG. 1, can then be unloaded to the main memory 40 asynchronously to the processor 14. In one embodiment of the present system (Unisys A11-1011), the write-Queue can hold up to four Write operations from the processor 14. However, the use of the write-Queue is not the major focus of the present system, but does provide enhancement in throughput.

The Write burst operation of FIG. 5A shows the use of a Write burst of up to four Write operations. Thus, the processor will write the first address to the main memory 40, while at the same time, writing the first data into the main memory 40, after which the processor sends the second Write address to main memory and Writes in the second group of data. During the writing of the first data "Write data one", the cache module is checked for a "hit" followed by an update of the cache data if the address was present in the cache. Likewise, for the second cycle of writing data, the cache module is checked for an address "hit" which, if occurs, will then update the cache data at that address.

Figure 5B:
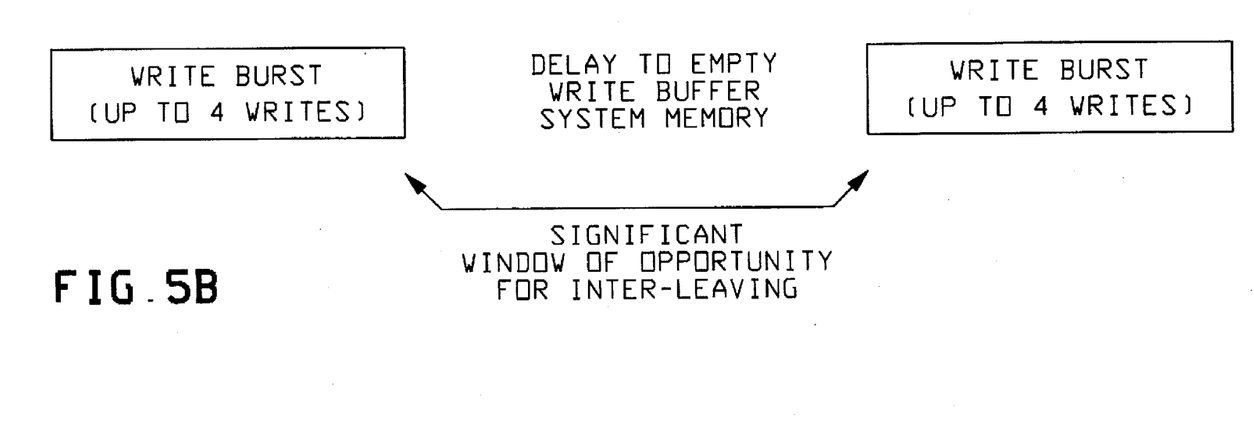
FIG. 5B is a schematic timing diagram showing the window of opportunity for interleaving invalidation cycles during multiple Write-Burst operations.

FIG. 5B is a drawing indicating the effect of using the Write Queue. Up to four write operations of a burst can come from the processor in immediate sequence. Thus, the cache resource module 19 is busy continually during this "mini burst" of four Write operations. However, if the processor's burst is greater than just four Write operations, as it most often is, then there is a significant time gap between the "mini-bursts" while the write-queue is being unloaded to main memory 40. During this gap seen in FIG. 5B, the cache resource becomes available temporarily, thus providing another "window of opportunity" for the interleaving of cache invalidation cycles between the processor string of operations.

D. Processor Non-Memory Type Operations

A final opportunity for significant interleaving is provided by the numerous processor "non-memory" type operations. These are operations that must leave the processor on to the system busses, but do not use the cache resources or main memory. Examples of such operations are indicated below for reference:

(i) Send Messages:—This operation allows the processor software to send communications to other processors and I/O modules.

(ii) Receive Messages:—This operation allows the processor software to receive communications from other processors and I/O modules.

(iii) Read Time-of-Day:—This operation allows the processor software to read the current system time from an I/O module.

(iv) Read-Error Log:—This operation allows the processor software to investigate various interrupt conditions.

(v) Write Maintenance:—This operation allows the processor software to send communications to the maintenance subsystem.

Each of these listed operations, although they are less frequent that "Read" operations, provide a good opportunity for the interleaving of cache invalidations. Each of these operations will take two processor clocks for execution. During these periods, at lease one cache invalidation cycle can be completed. The invalidation cycle will occur in parallel with the processor operation. Thus, the cache invalidation operation and these types of processor operations can "overlap" each other. Again here, the invalidation cycle is "invisible" to the processor 14, that is to say, it does not normally have to wait or delay any of the processor's real work while the cache is tied-up doing the overhead work of invalidations.

Special Correction Feature

Of all the windows of opportunity for the interleaving of cache operations, the most productive and most frequent one is that of the Read-Miss situation. Referring to FIG. 4 it was seen, that to provide this significant window of interleaving opportunity, the cache is "marked as valid" early in the cycle. This is seen in the clock period referred to as 1a in FIG. 4. Here, the cache is marked as having "valid data" for the Read address "before" the data is actually placed and contained in the cache Data RAM 19d. The data is not actually put into the cache until it is received from main memory, but at a "much later" time period.

This early "marking as valid" is necessary to free-up the cache Tag 19t resource during the long time gap of waiting for the return of memory data from main memory 40. However, this early marking has a potential serious consequence. There are two different ways that the current "Read-Miss" operation over the system busses 22s to main memory 40 may not terminate normally. That is to say, no real data will be returned to the processor 14 to be put in the cache module 19. These two abnormal system bus operation termination conditions are indicated below as follows:

(a) INVALID ADDRESS CONDITION: In this situation, the processor software has addressed a non-existing location in main memory 40. The processor software has "interrupt" facilities for handling this type of situation, but the cache module 19 has already been "marked" as "valid" for an address for which it has no valid data. This condition, of course, cannot be tolerated.

(b) BUS RETRY LIMIT CONDITION: In this situation, some system bus contention has occurred, which has caused either a "retry" or a "timeout" or a "bus parity error" condition to occur. The occurrence of these situations will normally be handled by the bus protocols until a specified limit is reached. In the present system, the limit set is equal to 32 retry cycles at trying to complete the bus operation. After this, the operation will be "aborted" That is to say, on the Read-Miss cycle, no data will be returned. Again, the software can handle this case satisfactorily, but the cache module 19 has been falsely marked. One major feature of the presently disclosed system is the factor that resolves the dangerous situation of "false marking of address locations in cache". When either of the above two abnormal termination conditions (a) and (b) are detected for a Read-Miss operation, a special flag flip-flop 20f is set to remember that the condition has occurred. The flip-flop 20f shown in the Cache Control Logic 20c of FIG. 1 is "set" at clock 1a of FIG. 4 on Read-Miss and then "reset" when the Read-Miss is completed. Then, at the clock time 1b of FIG. 4, there is a special action of "marking as invalid" which occurs within the cache Tag unit 19t. Thus, instead of loading the return data into the cache data RAM 19d, the cache Tag 19t (which at time 1a, had been "marked as valid") is then at the time period designated 1b, then "marked as invalid". The valid bit "V" status at the address in Tag RAM 19t is set so that V=0 (invalid). Thus, the cache "world" is made safe from false or bad cache data which had previously been marked as "valid".

Described herein has been a digital network where a processor is serviced by a cache module and main memory such that there is little or no inhibition to processor cycles of operation even though there are ongoing invalidation cycles being effectuated within the cache memory. The system functions to detect those periods, especially during Read-Miss and other similar operations, when the processor is idling or waiting for data, to utilize these periods for the completion of invalidation operations without inhibiting the rapid execution of processor operators.

While one implementation of the above-described optimization system has been indicated, it should be understood that other implementations may be derived, which still fall within the scope of the attached claims.

What is claimed is:

1. In a computer network wherein a central processor is connected to main memory via a system bus and also connected to a cache memory means via a cache bus, a system for never inhibiting processor operations by allocating invalidation cycles to said cache memory means only when said central processor is in an idle or waiting-for response state or communicating with other modules in the network besides said cache memory and main memory, said system comprising:

(a) a central processor connected via a processor bus and a cache bus to a cache memory means, said processor including:
  (I) means for requesting and accessing data from said cache memory means in 3 clock cycles regardless of whether the address of the requested data is an odd number or an even number;
  (ii) means for requesting and accessing data from said main memory in N processor-main memory clock cycles wherein N is greater than 3;

(b) said cache memory means including
  (b1) a Tag RAM for holding addresses being undifferentiated in location as to odd and even addresses;
  (b2) a data RAM for holding word data at address locations corresponding to addresses residing in said Tag RAM;

(c) spy logic means for sensing write addresses to said main memory appearing on said system bus including:
  (c1) means to store said sensed addresses into an invalidation queue;

(d) said invalidation is for holding addresses to be invalidated in said Tag RAM during the execution of said invalidation cycles;

(e) means to sense a Read-Miss operation to said cache memory means including:
  (e1) means to initiate the execution of said invalidation cycles during the multiple number of "N" processor-main memory clock cycles being used while requested word data is being searched-for in said main memory.

2. The system of claim 1 wherein said means to sense a Read-Miss operation further includes:
(a) means to switch bus direction for cache access to said invalidation queue instead of said central processor;
(b) means to use an undifferentiated address in said invalidation queue to check for an address hit in said Tag RAM;
(c) means, when an address hit occurs in said Tag RAM, to mark said address with an invalid bit to complete an invalidation cycle;
(d) wherein said means (a) (b) (c) are executed in 3 processor clock cycles.

3. The system of claim 1 wherein said means to sense a Read-Miss operation when addressing a non-existent location in main memory involving non-existing data, includes:
(a) means to mark the addressed location in said Tag RAM as "valid" while searching said main memory for return of requested data;
(b) means to mark said addressed location in said Tag RAM as "invalid" after inability of finding said non-existing data from said main memory.

4. The system of claim 1 wherein said means to sense Read-Miss operation further includes:
(a) means to mark an addressed Tag RAM location as "valid" while seeking access to main memory during retry cycles on said system bus;
(b) means to mark said addressed Tag RAM location as "invalid" when said retry cycles are aborted and no access to main memory was completed.

5. The system of claim 1 which further includes:
(a) means to execute invalidation cycles from said invalidation queue during those periods when said central processor is using said system bus for communication with other modules in the network besides the cache memory and main memory.

6. The system of claim 1 wherein said invalidation cycle is interleaved between the start of a processor Read-Miss operation and the completion of the transfer of the requested word data into said cache memory means.

7. The system of claim 1 wherein said invalidation cycle is interleaved between the start of a processor Read-Lock operation and the final completion of said Read-Lock operation wherein said processor has swapped data at a designated address.

8. The system of claim 1 which includes:
(f) Write queue means connected to said processor bus and to said system bus including;
 (f1) means to store W write addresses from said central processor;
 (f2) means to transmit a burst of said W addresses to said main memory and to said cache memory means;
 (f3) means to execute invalidation cycles from addresses in said invalidation queue during periods while the transmission of said W addresses from said Write queue means to said main memory and said cache memory means is undergoing.

9. The system of claim 1 wherein said invalidation cycles are executed during time periods when said central processor is sending or receiving messages between modules other than said main memory or cache memory means.

10. A system for enhancing processor throughput while also maintaining data word integrity of a cache memory means caching data from a main memory, said cache memory means being immediately accessible to said processor regardless of whether the requested address is odd or even, and wherein allocating invalidation cycles to said cache memory means only when said processor is in an idle or waiting-for response state or communicating with modules other than said cache memory means and said main memory, said system comprising:

(a) means for utilize those periods, when said processor is waiting for data from main memory, for execution of invalidation cycles to said cache memory means;

(b) means to utilize those periods, when said processor is communicating with modules other than said cache memory means and main memory, for execution of invalidation cycles to said cache memory means;

(c) means to set, on a cache miss operation, and address in said cache memory means as valid while searching said main memory for return of requested data, wherein said address is the address of the requested data; and (d) means to set said address as invalid when said cache miss operation is not completed by receiving data from said main memory.

* * * * *